US011056803B2

(12) United States Patent
Yin et al.

(10) Patent No.: US 11,056,803 B2
(45) Date of Patent: Jul. 6, 2021

(54) SPRING CLAMP FOR OPTICS (71) Applicant: Lumentum Operations LLC, Milpitas, CA (US)

(72) Inventors: Yong Yin, Milpitas, CA (US); Bryed Billerbeck, Milpitas, CA (US); Felix Brunner, Zurich (CH); Yves Netzer, Zurich (CH)

(73) Assignee: Lumentum Operations LLC, San Jose, CA (US)

( * ) Notice: Subject to any disclaimer, the term of this patent is extended or adjusted under 35 U.S.C. 154(b) by 325 days.

(21) Appl. No.: 15/702,250

(22) Filed: Sep. 12, 2017

(65) Prior Publication Data
US 2019/0081416 A1 Mar. 14, 2019

(51) Int. Cl.
*H01R 4/38* (2006.01)
*B25B 27/26* (2006.01)
*H01R 4/48* (2006.01)
*G02B 6/38* (2006.01)
*H01R 9/18* (2006.01)
*B25B 5/14* (2006.01)
*B25B 5/10* (2006.01)
*B25B 5/00* (2006.01)

(52) U.S. Cl.
CPC ............... *H01R 4/38* (2013.01); *B25B 5/003* (2013.01); *B25B 5/10* (2013.01); *B25B 5/14* (2013.01); *B25B 27/26* (2013.01); *G02B 6/3807* (2013.01); *H01R 4/4818* (2013.01); *H01R 4/4863* (2013.01); *H01R 9/18* (2013.01); *B60G 2206/921* (2013.01); *F16M 2200/025* (2013.01)

(58) Field of Classification Search
None
See application file for complete search history.

(56) References Cited

U.S. PATENT DOCUMENTS

| 5,737,346 A * | 4/1998 | Stenstrom ................ G02B 7/00 359/326 |
| 2004/0105177 A1* | 6/2004 | Ebinuma ............. G03F 7/70825 359/871 |
| 2008/0144199 A1* | 6/2008 | Schoeppach ......... G02B 7/1824 359/824 |
| 2013/0293964 A1* | 11/2013 | Marr ...................... G02B 7/182 359/618 |

* cited by examiner

Primary Examiner — Robert E. Tallman
(74) Attorney, Agent, or Firm — Harrity & Harrity, LLP (57) ABSTRACT

An optical device may include an optic disposed in an optical path. The optical device may include a mount to dispose the optic in the optical path. The optical device may include a plurality of spring clamps to attach the optic to the mount. The spring clamp, of the plurality of spring clamps, may include a body, a spring, and a screw. The screw may be to attach to the mount and to compress the spring. The spring may be to dispose a leading edge of the body against the optic. The spring clamp may be to maintain the optic in the optical path for a thermal cycle of at least between approximately −50° C. and approximately 130° C.

21 Claims, 5 Drawing Sheets

SPRING CLAMP FOR OPTICS

TECHNICAL FIELD

The present disclosure relates to optical systems. More particularly, the present disclosure relates to a spring clamp for an optic to enable the optic to be mounted in an alignment.

BACKGROUND

An optic may be positioned in an alignment to enable optical sensing, optical communications, or the like. For example, a mirror may be aligned with a laser to reflect a beam from the laser or a portion of the beam. In this case, the mirror may be aligned to other optical components to form a laser resonator. As another example, a lens may be aligned with a laser to alter a beam transmit by the laser, such as to focus the beam, defocus the beam, collimate the beam, or the like. As yet another example, an optical filter may be aligned with an optical sensor to filter a portion of light directed toward the optical sensor. As yet another example, a grating may be aligned in an optical path to split a beam or combine a beam.

For some optics, an epoxy may be used to hold an optic in a mount that aligns the optic with an optical path (e.g., with a laser to provide a laser beam, an optical sensor to receive light, a semiconductor wafer that is to be diced, etc.). However, a mismatch between a first coefficient of thermal expansion of the mount, a second coefficient of thermal expansion of the epoxy, and/or a third coefficient of thermal expansion of the optic may result in thermal stress being induced by temperature cycling. This may cause the epoxy to crack and/or delaminate, which may skew the optic from an alignment with the optical path.

A mount may be used without an epoxy to position an optic in alignment with an optical path. For example, the mount may include a lock washer to clamp the optic in a static alignment. However, a force applied by the lock washer may be relatively unpredictable, resulting in the force failing to be within a range of forces for ensuring the static alignment without damaging the optic. Moreover, a lock washer may cause a concentration of line contact stress on the optic, which may reduce a durability of the optic. Accordingly, it is desirable for a spring clamp that provides a more consistent spring force and reduces a concentration of line contact stress on the optic.

SUMMARY

According to some possible implementations, a clamp may include a body. The body may include a leading edge to clamp an optic to a mount. The body may include an opening to receive a spring and a screw. The screw may be to compress the spring. The screw may be to cause the spring to apply a force to the leading edge to clamp the optic to the mount. The mount, the body, and the optic may be associated with at least two coefficient of thermal expansion (CTE) values that differ by at least $10 \times 10^{-6}$/Kelvin (K).

According to some possible implementations, an optical system may include a mount. The optical system may include a plurality of clamps. The plurality of clamps includes at least one spring clamp. The spring clamp includes a body, a spring disposed in an opening of the body, and an attachment piece disposed into the opening of the body. The optical system may include an optic attached to the mount by the plurality of clamps. The optic may be associated with a threshold diameter of greater than approximately 5 millimeters (mm).

According to some possible implementations, an optical device may include an optic disposed in an optical path. The optical device may include a mount to dispose the optic in the optical path. The optical device may include a plurality of spring clamps to attach the optic to the mount. The spring clamp, of the plurality of spring clamps, may include a body, a spring, and a screw. The screw may be to attach to the mount and to compress the spring. The spring may be to dispose a leading edge of the body against the optic. The spring clamp may be to maintain the optic in the optical path for a thermal cycle of at least between approximately −50° C. and approximately 130° C.

DETAILED DESCRIPTION

The following detailed description of example implementations refers to the accompanying drawings. The same reference numbers in different drawings may identify the same or similar elements.

An optical system may include multiple optical components that are arranged in a particular alignment with an optical path. For example, a mirror may be aligned with a laser and/or one or more other optical components to reflect a beam from the laser, partially reflect a beam from the laser, form a laser resonator, or the like. Similarly, in a laser cutting system, a laser may be aligned with an optic that causes light to be directed to a target for laser cutting. Similarly, in an optical communications system, an optical transmitter may be aligned with one or more optics, one or more optical fibers, an optical receiver, or the like to enable optical communications. Similarly, in a sensing system, an optical receiver may be aligned with an optic that causes light to be directed to the optical receiver. The optic may be attached to a mount, such as a mount of an optical bench, to maintain the optic in a static position. The optic may include a lens, a filter, or the like. The mount may be physically coupled to the optic using an epoxy or a washer.

However, with regard to using an epoxy, a coefficient of thermal expansion (CTE) mismatch between the optic, the epoxy, and the mount may result in the epoxy cracking and/or delaminating, which may disrupt the alignment with the optical path. Similarly, with regard to using a washer, a relatively unpredictable force caused by applying torque to a fastener of the washer and a threshold concentration of line contact stress by the washer may reduce a durability of the optic. Some implementations, described herein, may provide a spring clamp for attaching an optic to a mount, thereby enabling the optic to be aligned in an optical system. Moreover, based on using a spring clamp, some implementations described herein may provide a relatively constant and controllable clamp force, a reduced line stress concentration, and an improved response to variable thermal conditions relative to other techniques for attachment. Furthermore, some implementations described herein may improve optical beam stability of an optical beam passed through the optic when the optic is attached to a mount using a spring clamp.

Figure 1:
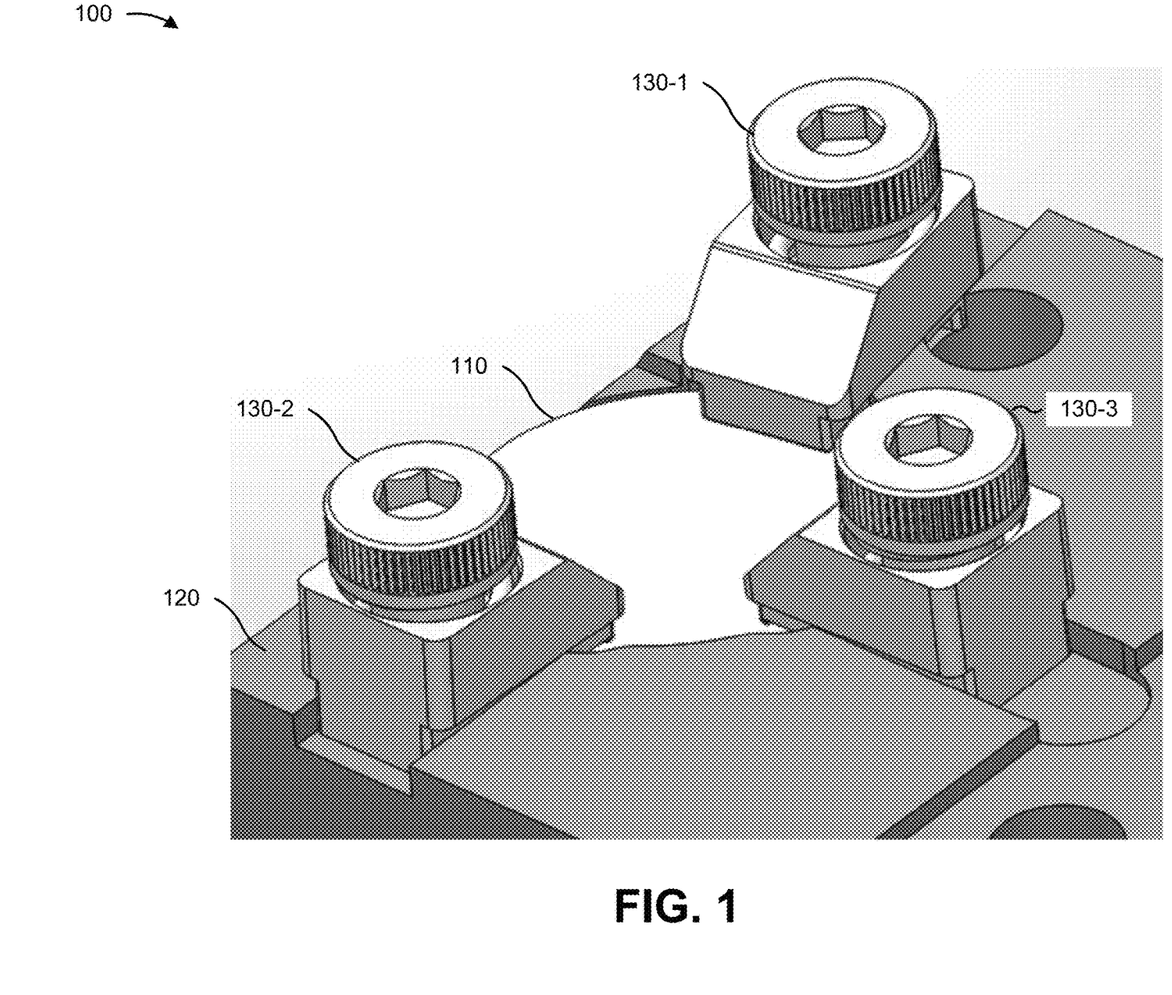
FIG. 1 is a diagram of an overview of an example implementation described herein.

FIG. 1 is a diagram of an overview of an example implementation 100 described herein. As shown in FIG. 1, example implementation 100 may show an optic 110, a mount 120, and a set of clamps 130-1 through 130-3 (hereinafter referred to individually as "clamp 130," and collectively as "clamps 130").

Optic 110 includes a component to direct or alter light. For example, optic 110 may include a lens, a filter, a filter coating, a prism, a window, a reflector, an optical coating, an eyepiece, a mirror, a grating, a crystal, and/or the like. In some implementations, optic 110 may be associated with a particular shape, such as a round optic, a square optic, a rectangular optic, a cubic optic, a spherical optic, a prism optic, a triangular optic, and/or the like. In some implementations, optic 110 may be included in a particular optical device or optical system. For example, optic 110 may be a component of a laser system (e.g., a system that includes ultra-fast laser, which may emit pulses of a duration of less than a nanosecond, less than a picosecond, or the like; a kilowatt laser; an ultra-violet (UV) laser; a Q-switched laser; etc.), a telescope, a medical device, a sensor device, a measurement device, an optical communication system, a manufacturing system (e.g., a system that includes a laser for cutting, ablating, etc.), or the like. In some implementations, the particular optical device or optical system may include a camera, a cell phone, a computer (e.g., a tablet computer, a laptop computer, etc.), and/or the like.

In some implementations, optic 110 may be associated with a threshold diameter. For example, optic 110 may be associated with a diameter of greater than approximately 0.5 millimeters (mm), greater than approximately 1 mm, greater than approximately 2 mm, greater than approximately 5 mm, greater than approximately 10 mm, greater than approximately 20 mm, or the like. Additionally, or alternatively, optic 110 may be associated with a diameter of approximately 5 mm. In some implementations, optic 110 may be associated with a threshold thickness. For example, optic 110 may be associated with a thickness greater than approximately 0.25 mm, greater than approximately 0.5 mm, greater than approximately 1 mm, greater than approximately 2 mm, or the like. Additionally, or alternatively, optic 110 may be associated with a thickness of approximately 0.6 mm. In this case, a threshold size (e.g., a threshold diameter, a threshold thickness, etc.) may cause another type of clamp to crack optic 110, bend optic 110, or fail to maintain a position of optic 110 in alignment with an optical path. Based on using one or more clamps 130, optic 110 may be attached to mount 120 without damaging optic 110 or failing to maintain the position of optic 110.

Mount 120 includes a component to align an optic with an optical path. For example, mount 120 may include testing mount, an industrial mount, a communications mount, an optical bench mount, an optical table mount, a chassis, a wafer, a substrate, or the like. In some implementations, mount 120 may be a particular material, such as an aluminum mount, a stainless steel mount, or the like. In some implementations, mount 120 may include an opening. For example, mount 120 may include an opening to receive optic 110 and to permit light to be received at and provided from optic 110. Additionally, or alternatively, mount 120 may include one or more openings to receive one or more clamps 130. For example, mount 120 may include a threaded opening to receive a screw of clamp 130. Additionally, or alternatively, mount 120 may receive another type of attachment piece of clamp 130, such as a bolt, a rivet, a nail, or the like. In some implementations, mount 120 may receive multiple types of clamps. For example, mount 120 may receive a combination of one or more clamps 130 and one or more other types of clamps.

Clamp 130 includes a component to support optic 110 in an opening of mount 120. For example, clamp 130 may include a spring clamp that includes a clamp body with an opening to receive a spring and a screw. In some implementations, the spring clamp may be another spring type, such as a leaf spring, a torsion spring, and/or the like. Additionally, or alternatively, clamp 130 may include an opening to receive another type of attachment piece, such as a nail, a bolt, a rivet, or the like. In some implementations, clamp 130 may be a particular material, such as an aluminum clamp, a stainless steel clamp, a copper clamp, or the like. In some implementations, clamp 130 may include multiple materials, such as a first material for a clamp body, a second material for a spring, a third material for an attachment piece, or the like. In some implementations, clamp 130 may be associated with less than a threshold size, such as less than approximately 10 millimeters (mm) in length, less than 8 mm in length, less than 10 mm in width, less than 4 mm in width, less than 10 mm in height, less than 5 mm in height, or the like. In some implementations, a particular material, described herein, may be a plated material.

In some implementations, multiple clamps 130 may be used to attach optic 110 to mount 120. For example, a set of two clamps 130, three clamps 130, four clamps 130, or another quantity of clamps 130 may be used to support optic 110 in an opening of mount 120. Alternatively, a single clamp 130 may be used to support optic 110 in the opening of mount 120. In some implementations, a quantity of clamps 130 may be selected based on a size of optic 110. For example, when optic 110 is associated with a threshold size, a threshold quantity of clamps 130 may be selected, such as three clamps 130, four clamps 130, or the like. In some implementations, a quantity of clamps 130 may be selected based on a mechanical characteristic of optic 110. For example, when optic 110 is associated with reduced durability of a threshold amount of applied force by a clamp 130, a quantity of clamps 130 may be selected to ensure less than the threshold amount of force is applied by each clamp 130. In some implementations, a combination of clamps may be used to attach optic 110 to mount 120. For example, at least one clamp 130 and at least one non-spring clamp may be used to attach optic 110 to mount 120. Additionally, or alternatively, at least one clamp 130 and at least one other type of fastener, such as a nail, a bolt, a rivet, an adhesive, and/or the like may be used to attach optic 110 to mount 120.

As indicated above, FIG. 1 is provided merely as an example. Other examples are possible and may differ from what was described with regard to FIG. 1.

Figure 2A:
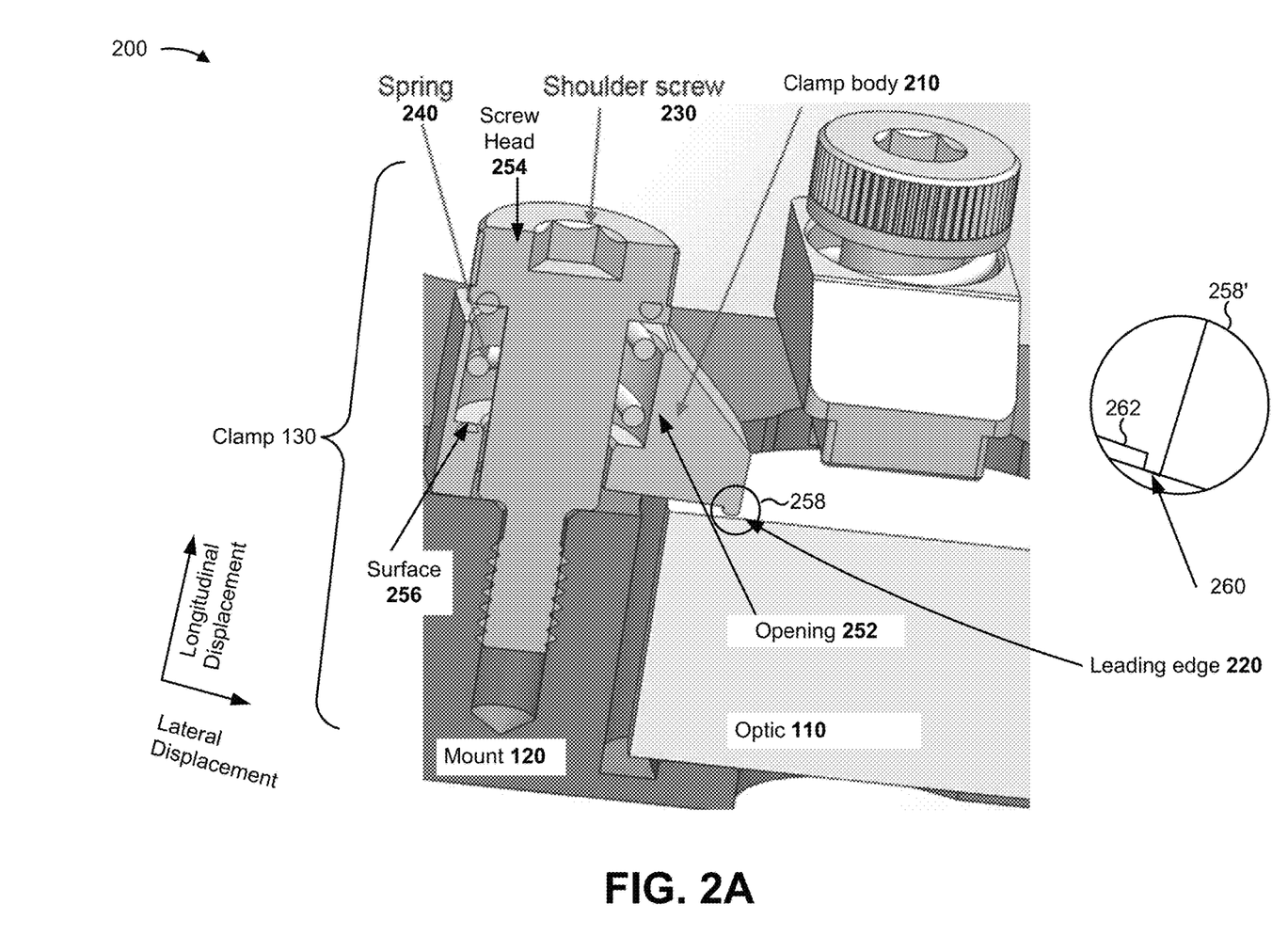
FIGS. 2A and 2B are diagrams of an example implementation of a clamp for optics.
Figure 2B:
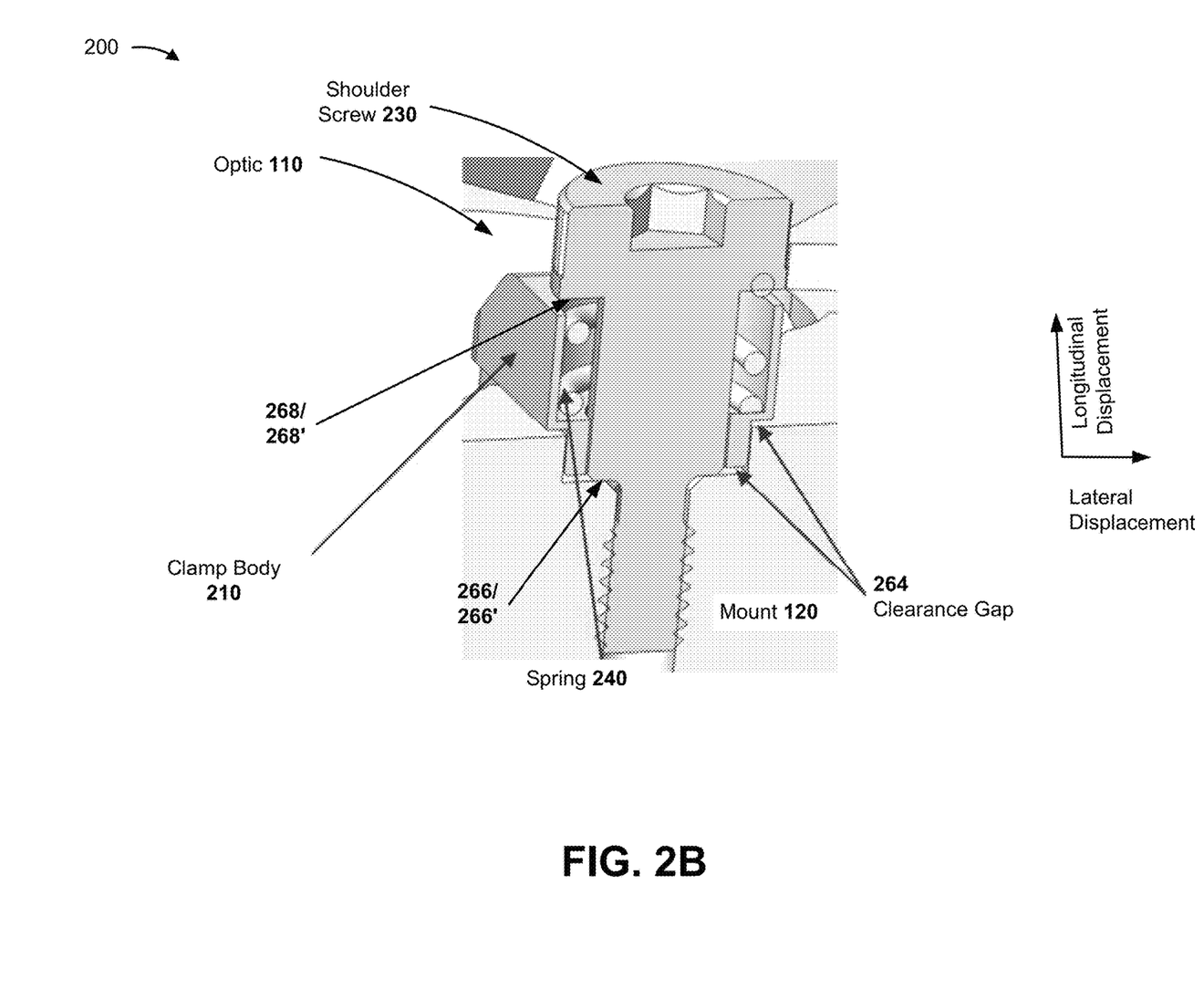

FIGS. 2A and 2B are diagrams of an example implementation 200. As shown in FIGS. 2A and 2B, clamp 130 may include a clamp body 210, a leading edge 220, a shoulder screw 230, and a spring 240.

As shown in FIG. 2A, clamp body 210 may include an opening 252 into which spring 240 and shoulder screw 230 may be inserted. In some implementations, spring 240 may be associated with a particular spring constant. For example, spring 240 may be associated with a spring constant of between approximately 3000 Newtons/meter (N/m) and approximately 8000 N/m, between approximately 5000 N/m and approximately 6000 N/m, or the like. In some implementations, spring 240 may decouple a torque force applied to shoulder screw 230 from a clamp force applied to optic 110. For example, when shoulder screw 230 is torqued, screw head 254 may compress spring 240 against surface 256 to cause leading edge 220 to be compressed against optic 110. In this case, the clamp force applied by leading edge 220 to optic 110 relates to a spring constant of spring 240, rather than to the torque force applied to shoulder screw 230. In some implementations, a Nyloc fastener or a patch-lock fastener may be used for shoulder screw 230.

In this way, clamp 130 reduces a variability in a clamping force applied to optic 110 relative to another technique for clamping that does not decouple a force applied to a shoulder screw 230 (or another attachment piece) from a force applied to optic 110. Moreover, based on decoupling the force applied to optic 110 from the force applied to the shoulder screw 230, clamp 130 reduces a likelihood that human error in applying force to clamp 130 causes excessive force or insufficient force to be applied to optic 110. Furthermore, based on decoupling the force applied to optic 110 from the force applied to shoulder screw 230, clamp 130 permits greater than a threshold force to be applied to shoulder screw 230 to ensure that the fastener maintains an attachment of clamp 130 to mount 120 without causing greater than a threshold force to be applied to optic 110.

As shown by call-out diagram 258/258', leading edge 220 may be associated with a flat surface 260 that is disposed contiguous to optic 110, in some implementations. For example, leading edge 220 may include surface 260, which may be parallel with, but not co-planar to surface 262, thereby enabling optic 110 to be leveled by a set of clamps 130. In some implementations, leading edge 220 may be associated with another type of surface, such as a rounded surface, a grooved surface, or the like. In some implementations, leading edge 220 may be associated with a particular friction coefficient selected to suppress lateral movement of optic 110. In some implementations, shoulder screw 230 may be a particular type of screw. For example, shoulder screw 230 may be an M2 screw. Additionally, or alternatively, shoulder screw 230 may be another type of screw. Additionally, or alternatively, shoulder screw 230 may be another type of attachment piece, such as a fastener, a nail, a bolt, a nut, a rivet, a washer, or a combination thereof.

As shown in FIG. 2B, clamp 130 may be disposed such that a clearance gap 264 separates clamp 130 from mount 120. For example, when shoulder screw 230 is bottomed out (i.e., is torqued such that surface 266 of shoulder screw 230 is contiguous to a surface 266' of mount 120), surface 268 of shoulder screw 230 may be contiguous to surface 268' of clamp 130 to displace clamp 130 such that a separation between clamp 130 and mount 120 remains greater than a threshold. In this case, clearance gap 264 may be greater than approximately 1 mm, greater than approximately 2 mm, greater than approximately 3 mm, greater than approximately 5 mm, greater than approximately 10 mm, or the like. In some implementations, the separation between clamp 130 and mount 120 may be approximately 3 mm. In this way, clamp 130 and mount 120 may allow a spring 240 to be displaced longitudinally (e.g., compressed or expanded) to maintain constant pressure on optic 110 even when shoulder screw 230 is bottomed out.

In this way, clamp 130 may account for a coefficient of thermal expansion mismatch between optic 110, mount 120, and clamp 130. For example, clamp 130 may permit a coefficient of thermal expansion (CTE) mismatch causing differential expansion/contraction of optic 110, mount 120, and/or clamp 130 of greater than a threshold differential (expressed as $10^{-6}$/Kelvin (K)) of approximately 1, approximately 5, approximately 10, approximately 15, approximately 20, approximately 25, or the like. Based on permitting a CTE mismatch of greater than a threshold, clamp 130 may permit mount 120 to be manufactured from a material such as aluminum (CTE of approximately 21 to 24) or stainless steel (CTE of approximately 10 to 17), thereby reducing cost relative to a CTE matched material, such as Invar (CTE of approximately 1 to 2), Kovar (CTE of approximately 5 to 6), or the like. Thus, clamp 130 permits selection of a material for mount 120 and/or clamp 130 of greater than a threshold CTE value, such as greater than approximately 1, greater than approximately 2, greater than approximately 5, greater than approximately 6, greater than approximately 10, greater than approximately 11, greater than approximately 17, greater than approximately 18, or the like. Moreover, aluminum and/or stainless steel may improve heat transfer by mount 120 from optic 110 and/or clamp 130 relative to using a CTE matched material, such as Invar, Kovar, or the like, thereby improving performance of an optic 110 attached to mount 120 using clamp 130. Moreover, aluminum and/or stainless steel may result in reduced cost, reduced maintenance (e.g., reduced cleaning requirements), and/or the like. In some implementations, another material may be used for mount 120, such as a copper material, a plated material, and/or the like, which may be associated with improved heat transfer, reduced cost, reduced maintenance, and/or the like relative to a CTE matched material.

In some implementations, clamp 130 may maintain a position of optic 110 without adversely affecting durability of optic 110 for a threshold thermal cycle. For example, an optical system that includes, for example, optic 110, mount 120, and clamp 130 may be associated with a thermal cycle of between approximately −100 degrees Celsius (° C.) and approximately 200° C., between approximately −50° C. and approximately 150° C., between approximately −25° C. and approximately 100° C., or the like. In some implementations, clamp 130 may maintain a position of optic 110 without adversely affecting durability of optic 110 for a thermal cycle of between approximately −50° C. and approximately 130° C. Additionally, or alternatively, clamp 130 may maintain a position of optic 110 without adversely affecting durability of optic 110 for a threshold level of force applied to, for example, mount 120. For example, clamp 130 may maintain the position of optic 110 for a g-force applied to mount 120 of greater than approximately 10 g-forces (G), approximately 5 G, approximately 2 G, approximately 1 G, or the like. In some implementations, clamp 130 may maintain the position of optic 110 for a g-force of approximately 8 G. In some implementations, clamp 130 may maintain the position of optic 110 within a threshold tolerance, such as within a displacement of less than 10 mm, less than 5 mm, less than 2 mm, less than 1 mm, less than 0.75 mm, less than 0.5 mm, less than 0.2 mm, less than 0.1 mm, and/or the like.

As indicated above, FIGS. 2A and 2B are provided merely as examples. Other examples are possible and may differ from what was described with regard to FIGS. 2A and 2B.

Figure 3A:
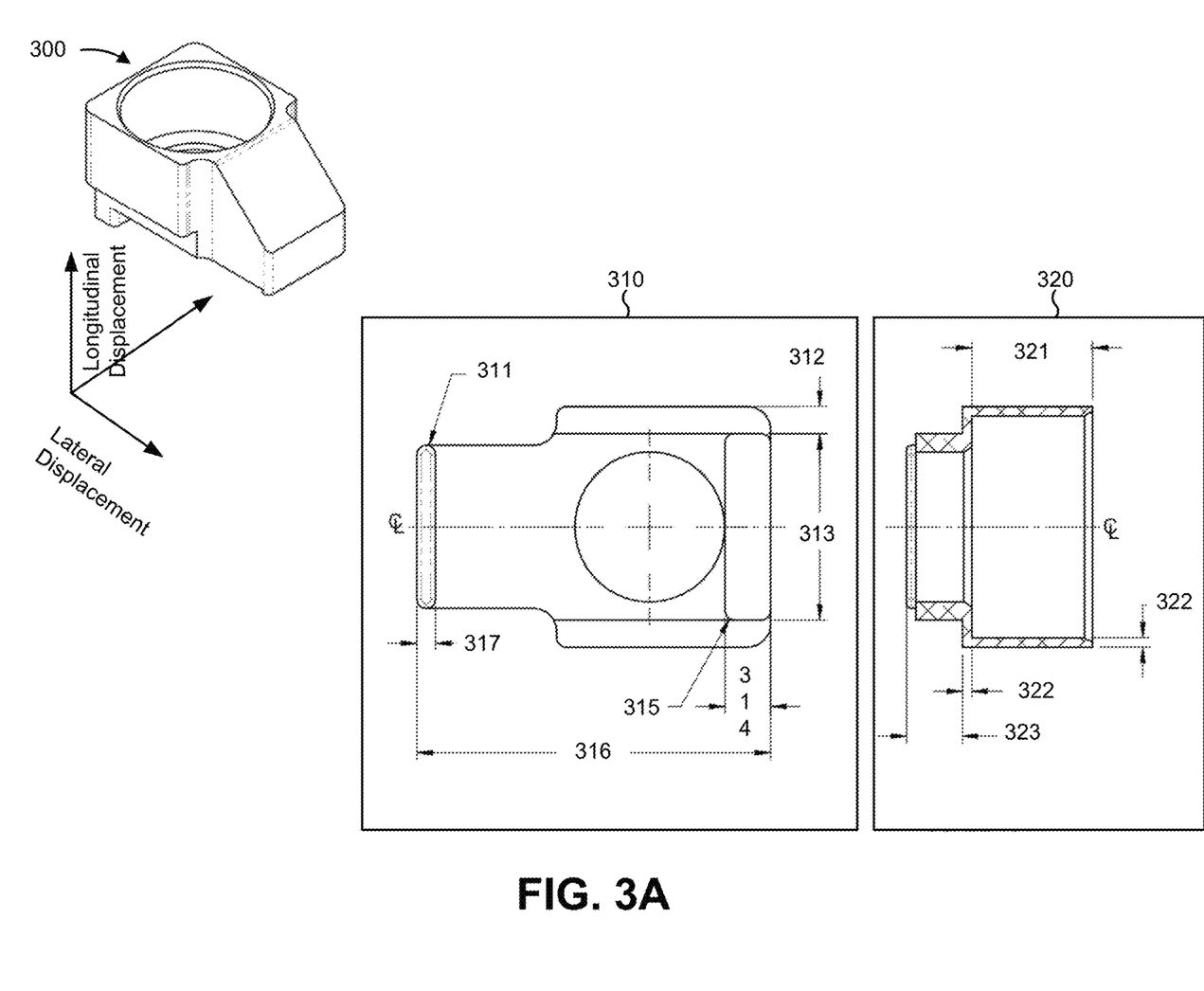
FIGS. 3A and 3B are diagrams of an example implementation of a clamp for optics.
Figure 3B:
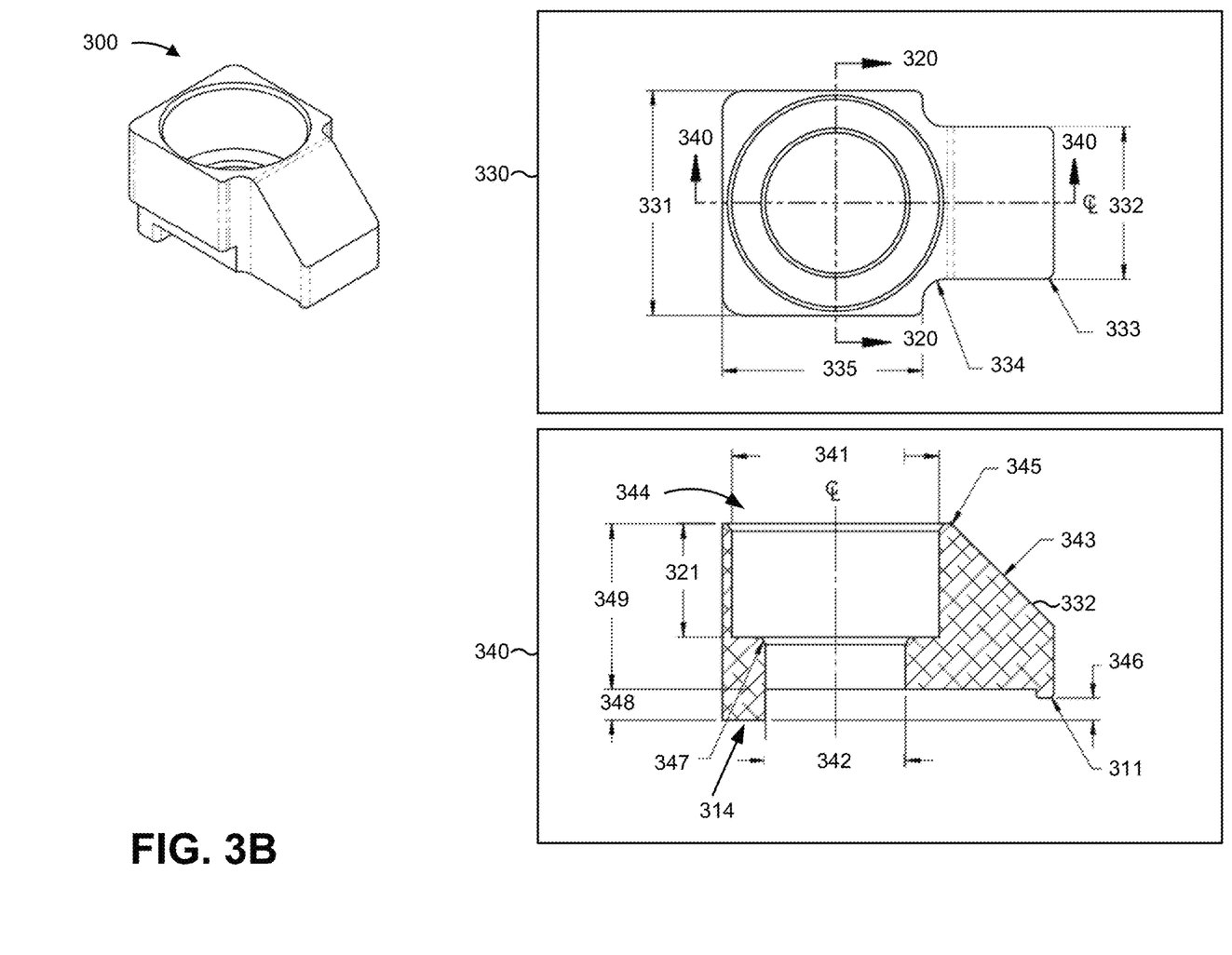

FIGS. 3A and 3B are diagrams of a clamp 300. Although FIGS. 3A and 3B are described in terms of a particular set of measurements, such measurements are only examples, other measurements may be possible that differ from what is described with regards to FIGS. 3A and 3B.

As shown in FIG. 3A, in bottom-up view diagram 310, clamp 300 includes a leading edge 311 that may be disposed contiguous to a surface of an optic to attach the optic to a mount. In some implementations, leading edge 311 may be associated with a rounded edge. For example, leading edge 311 may be associated with a 0.2 mm radius rounded edge. Clamp 300 includes a set of edge portions 312. An edge portion 312 may be approximately 0.6 mm and may be disposed contiguous to a surface of a mount. Clamp 300 includes a center portion 313 between the edge portions 312. In some implementations, center portion 313 may be associated with a width of approximately 4.0 mm, and may be disposed into a groove in a mount to reduce a displacement of clamp 300 relative to another clamp without edge portions 312 and center portion 313.

Clamp 300 includes a base portion 314. In some implementations, base portion 314 may be disposed contiguous to, for example, mount 120. In some implementations, base portion 314 may be associated with a width of 1.0 mm, and may be disposed into a groove in a mount to reduce a displacement of clamp 300 relative to another clamp without base portion 314. Base portion 314 may be associated with a curved edge 315. In some implementations, curved edge 315 may be associated with a radius of approximately 0.2 mm. As shown by reference number 316, clamp 300 may be associated with a length of approximately 7.6 mm. As shown by reference number 317, leading edge 311 may be associated with a width of 0.4 mm.

As further shown in FIG. 3A, and in cross-sectional view diagram 320, and by reference number 321, clamp 300 may include an opening associated with a depth of approximately 2.6 mm, and the opening may be to receive a spring and a head of an attachment piece (e.g., a head of a screw). As shown by reference number 322, clamp 300 may be associated with a wall thickness for the opening of approximately 0.2 mm. As shown by reference number 323, leading edge 311 may extend approximately 1.2 mm from a bottom the opening of clamp 300.

As shown in FIG. 3B, and in top-down view diagram 330, clamp 300 may include a body 331 with a width of approximately 5.16 mm. Clamp 300 may include an extension 332 that includes leading edge 311 is associated a width of approximately 3.5 mm. As shown by reference number 333, extension 332 is associated with a curved edge that may be associated with a radius of approximately 0.2 mm. As shown by reference number 334, a transitional curved edge disposed between extension 332 and body 331 may be associated with a radius of 0.5 mm. As shown by reference number 335, a length of body 331 may be approximately 4.6 mm.

As shown in FIG. 3B, and in cross-sectional view diagram 340, and by reference number 341, the opening in clamp 300 is associated with a first diameter of a first portion of approximately 4.76 mm. As shown by reference number 342, the opening in clamp 300 is associated with a second diameter of a second portion of approximately 3.22 mm. The first portion of the opening may be to receive a head of an attachment piece (e.g., shoulder screw 230) and a spring (e.g., spring 240). Spring 240 may be disposed against a bottom surface of the first portion of the opening. The second portion of the opening may be to receive a body portion of the attachment piece (e.g., a threaded portion of shoulder screw 230) and may be aligned with an opening of a mount (e.g., mount 120) to direct the body portion of the attachment piece into the mount.

As shown by reference number 343, extension 332 may extend approximately 2.3 mm at approximately 45 degrees from level with a surface 344 of clamp 300. As shown by reference number 345, a curve between surface 344 of clamp 300 and extension 332 may be approximately 0.2 mm. As shown by reference number 346, a bottom surface of leading edge 311 may be disposed approximately 0.5 mm above a bottom surface of base portion 314. As shown by reference number 347, a tapered portion between the first portion of the opening of clamp 300 and the second portion of the opening of clamp 300 may extend approximately 0.1 mm at approximately 60 degrees from level with surface 344 of clamp 300. As shown by reference number 348, the bottom surface of base portion 314 may be disposed by 0.7 mm from a bottom surface of extension 332. As shown by reference number 349, the bottom surface of leading edge 311 may extend 3.8 mm from surface 344 of clamp 300.

As indicated above, FIGS. 3A and 3B are provided merely as an example. Other examples are possible and may differ from what was described with regard to FIGS. 4A and 4B.

In this way, a clamp may enable use of a non-CTE matched material, such as aluminum or stainless steel, for the clamp or a mount for an optic of a threshold size, which may reduce cost, improve thermal dissipation, or the like relative to another type of material. Moreover, the clamp may maintain a constant force on an optic that is decoupled from a force applied to an attachment piece of the clamp, thereby improving a durability of the optic and reducing a likelihood that the optic loses alignment with an optical path.

The foregoing disclosure provides illustration and description, but is not intended to be exhaustive or to limit the implementations to the precise form disclosed. Modifications and variations are possible in light of the above disclosure or may be acquired from practice of the implementations.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A clamp, comprising:
    a body,
        the body including:
            a leading edge to clamp an optic to a mount; and
            an opening to receive a spring and a screw,
                the leading edge including a surface having at least a portion in contact with the optic and the portion in contact with the optic being positioned laterally adjacent to the opening,
the screw to longitudinally compress the spring, and
the screw to cause the spring to apply a force to the leading edge to clamp the optic to the mount,
where the mount, the body, and the optic are associated with at least two coefficient of thermal expansion (CTE) values that differ by at least $10 \times 10^{-6}$/Kelvin (K).

2. The clamp of claim 1, wherein the leading edge is to clamp optics of at least a threshold size,
the threshold size being greater than at least one of:
a 0.5 millimeter (mm) diameter,
a 1 mm diameter,
a 2 mm diameter,
a 5 mm diameter,
a 10 mm diameter,
a 20 mm diameter,
a 0.25 mm thickness,
a 0.5 mm thickness,
a 1 mm thickness, or
a 2 mm thickness.

3. The clamp of claim 1, where the force is decoupled from a torque applied to the screw to attach the clamp to the mount.

4. The clamp of claim 1, where the spring is associated with a spring constant of between approximately 3000 Newtons/meter (N/m) and approximately 8000 N/m.

5. The clamp of claim 1, where the leading edge is to clamp at least one of:
a lens,
a mirror,
a grating,
a crystal,
a filter, or
an optical coating.

6. An optical system, comprising:
a mount;
a plurality of clamps,
where the plurality of clamps include at least one spring clamp,
where the at least one spring clamp includes:
a body including a leading edge to clamp an optic to the mount,
the leading edge including a surface having at least a portion in contact with the optic and the portion in contact with the optic being positioned laterally adjacent to an opening of the body,
a spring compressed longitudinally in the opening of the body, and
an attachment piece disposed into the opening of the body; and
the optic attached to the mount by the plurality of clamps,
where the optic has a diameter of greater than approximately 5 millimeters (mm).

7. The optical system of claim 6, where the plurality of clamps includes at least one other clamp,
the at least one other clamp not being a spring clamp.

8. The optical system of claim 6, where the mount, at least one clamp of the plurality of clamps, and the optic have at least two coefficient of thermal expansion (CTE) values; and
where a difference between two of the at least two CTE values is greater than at least one of:
$1 \times 10^{-6}$/Kelvin (K),
$5 \times 10^{-6}$/K,
$10 \times 10^{-6}$/K, or
$17 \times 10^{-6}$/K.

9. The optical system of claim 6, where the mount has a coefficient of thermal expansion (CTE) value greater than at least one of:
$5 \times 10^{-6}$/Kelvin (K),
$11 \times 10^{-6}$/K,
$17 \times 10^{-6}$/K, or
$18 \times 10^{-6}$/K.

10. The optical system of claim 6, where the plurality of clamps is 3 clamps.

11. The optical system of claim 6, where each of the plurality of clamps is a spring clamp.

12. The optical system of claim 6, where the optic has a thickness of at least 0.6 mm.

13. The optical system of claim 6, where the mount includes a plurality of openings,
the optic being disposed in a first opening of the plurality of openings; and
a particular attachment piece corresponding to a spring clamp of the at least one spring clamp being disposed into a second opening of the plurality of openings.

14. The optical system of claim 6, where the attachment piece is at least one of:
a fastener,
a nail,
a bolt,
a nut,
a rivet,
a washer,
a screw, or
a combination thereof.

15. The optical system of claim 6, where the optical system is configured to maintain an alignment of the optic with an optical path for a thermal cycle of at least one of:
between approximately −100 degrees Celsius (° C.) and approximately 200° C.,
between approximately −50° C. and approximately 150° C.,
between approximately −25° C. and approximately 100° C.,
between approximately 0° C. and approximately 55° C., or
between approximately 10° C. and approximately 40° C.

16. The optical system of claim 6, where the optical system is configured to maintain an alignment of the optic with an optical path for a g-force applied to the mount of at least one of:
greater than approximately 10 g-forces (G),
greater than approximately 5 G,
greater than approximately 2 G, or
greater than approximately 1 G.

17. An optical device, comprising:
an optic disposed in an optical path;
a mount to dispose the optic in the optical path; and
a plurality of spring clamps to attach the optic to the mount,
a spring clamp, of the plurality of spring clamps, including a body, a spring, and a screw,
the body including a leading edge to clamp the optic to the mount,
the leading edge including a surface having at least a portion in contact with the optic and the portion in contact with the optic being positioned laterally adjacent to an opening of the body, the screw to attach to the mount and to longitudinally compress the spring,
the spring to dispose a leading edge of the body against the optic, and
the spring clamp to maintain the optic in the optical path for a thermal cycle of at least between approximately −50° C. and approximately 130° C.

18. The optical device of claim 17, where the optical device comprises at least one of:
a laser system,
a telescope,
a medical device,
a sensor device,
a measurement device,
an optical communication system, or
a manufacturing system.

19. The optical device of claim 17, where the spring clamp is associated with a length of less than approximately 10 millimeters (mm), a width of less than approximately 4 mm, and a height of less than approximately 5 mm.

20. The optical device of claim 17, further comprising a laser to provide abeam directed to the optic via the optical path.

21. The optical system of claim 6, wherein the attachment piece is a screw disposed in the opening of the body,
the screw being configured to compress the spring against the body to cause the leading edge to be compressed against the optic,
the screw being disposed longitudinally through the spring,
the screw including a threaded portion aligned with an opening in the mount, and
the opening in the mount being longitudinally adjacent to the opening in the body.

* * * * *